(12) United States Patent
Desai et al.

(10) Patent No.: US 9,028,985 B2
(45) Date of Patent: May 12, 2015

(54) RECORDING MEDIA WITH MULTIPLE EXCHANGE COUPLED MAGNETIC LAYERS

(75) Inventors: Mrugesh Desai, San Jose, CA (US); Kyongha Kang, Fremont, CA (US); Jian Zhou, Dublin, CA (US); B. Ramamurthy Acharya, Fremont, CA (US)

(73) Assignee: WD Media, LLC, San Jose, CA (US)

( * ) Notice: Subject to any disclaimer, the term of this patent is extended or adjusted under 35 U.S.C. 154(b) by 468 days.

(21) Appl. No.: 13/077,419

(22) Filed: Mar. 31, 2011

(65) Prior Publication Data

US 2012/0251846 A1 Oct. 4, 2012

(51) Int. Cl.
*G11B 5/673* (2006.01)
*G11B 5/66* (2006.01)
*G11B 5/65* (2006.01)

(52) U.S. Cl.
CPC ...... *G11B 5/66* (2013.01); *G11B 5/65* (2013.01)

(58) Field of Classification Search
None
See application file for complete search history.

(56) References Cited

U.S. PATENT DOCUMENTS

| | | | |
|---|---|---|---|
| 6,013,161 A | 1/2000 | Chen et al. | |
| 6,063,248 A | 5/2000 | Bourez et al. | |
| 6,068,891 A | 5/2000 | O'Dell et al. | |
| 6,086,730 A | 7/2000 | Liu et al. | |
| 6,099,981 A | 8/2000 | Nishimori | |
| 6,103,404 A | 8/2000 | Ross et al. | |
| 6,117,499 A | 9/2000 | Wong et al. | |
| 6,136,403 A | 10/2000 | Prabhakara et al. | |
| 6,143,375 A | 11/2000 | Ross et al. | |
| 6,145,849 A | 11/2000 | Bae et al. | |
| 6,146,737 A | 11/2000 | Malhotra et al. | |
| 6,149,696 A | 11/2000 | Jia | |
| 6,150,015 A | 11/2000 | Bertero et al. | |
| 6,156,404 A | 12/2000 | Ross et al. | |
| 6,159,076 A | 12/2000 | Sun et al. | |
| 6,164,118 A | 12/2000 | Suzuki et al. | |
| 6,200,441 B1 | 3/2001 | Gornicki et al. | |
| 6,204,995 B1 | 3/2001 | Hokkyo et al. | |
| 6,206,765 B1 | 3/2001 | Sanders et al. | |
| 6,210,819 B1 | 4/2001 | Lal et al. | |
| 6,216,709 B1 | 4/2001 | Fung et al. | |
| 6,221,119 B1 | 4/2001 | Homola | |
| 6,248,395 B1 | 6/2001 | Homola et al. | |
| 6,261,681 B1 | 7/2001 | Suekane et al. | |
| 6,270,885 B1 | 8/2001 | Hokkyo et al. | |
| 6,274,063 B1 | 8/2001 | Li et al. | |
| 6,283,838 B1 | 9/2001 | Blake et al. | |
| 6,287,429 B1 | 9/2001 | Moroishi et al. | |
| 6,290,573 B1 | 9/2001 | Suzuki | |
| 6,299,947 B1 | 10/2001 | Suzuki et al. | |

(Continued)

FOREIGN PATENT DOCUMENTS

WO 2010/038448 4/2010

OTHER PUBLICATIONS

Richter, H.J., The Physics of Perpendicular Records, Seagate Technology, Fremont, California, Dec. 2006.

(Continued)

*Primary Examiner* — Kevin Bernatz

(57) ABSTRACT

A magnetic recording (PMR) disk structure is described. The PMR disk structure may include a magnetic capping layer being substantially free of an oxide, an upper magnetic layer with an oxide content disposed directly below and in contact with the magnetic capping layer, and an upper exchange coupling layer disposed below the upper magnetic layer.

26 Claims, 5 Drawing Sheets

(56) References Cited

U.S. PATENT DOCUMENTS

| | | |
|---|---|---|
| 6,303,217 B1 | 10/2001 | Malhotra et al. |
| 6,309,765 B1 | 10/2001 | Suekane et al. |
| 6,358,636 B1 | 3/2002 | Yang et al. |
| 6,362,452 B1 | 3/2002 | Suzuki et al. |
| 6,363,599 B1 | 4/2002 | Bajorek |
| 6,365,012 B1 | 4/2002 | Sato et al. |
| 6,381,090 B1 | 4/2002 | Suzuki et al. |
| 6,381,092 B1 | 4/2002 | Suzuki |
| 6,387,483 B1 | 5/2002 | Hokkyo et al. |
| 6,391,213 B1 | 5/2002 | Homola |
| 6,395,349 B1 | 5/2002 | Salamon |
| 6,403,919 B1 | 6/2002 | Salamon |
| 6,408,677 B1 | 6/2002 | Suzuki |
| 6,426,157 B1 | 7/2002 | Hokkyo et al. |
| 6,429,984 B1 | 8/2002 | Alex |
| 6,468,670 B1 | 10/2002 | Ikeda et al. |
| 6,482,330 B1 | 11/2002 | Bajorek |
| 6,482,505 B1 | 11/2002 | Bertero et al. |
| 6,500,567 B1 | 12/2002 | Bertero et al. |
| 6,528,124 B1 | 3/2003 | Nguyen |
| 6,548,821 B1 | 4/2003 | Treves et al. |
| 6,552,871 B2 | 4/2003 | Suzuki et al. |
| 6,565,719 B1 | 5/2003 | Lairson et al. |
| 6,566,674 B1 | 5/2003 | Treves et al. |
| 6,571,806 B2 | 6/2003 | Rosano et al. |
| 6,628,466 B2 | 9/2003 | Alex |
| 6,664,503 B1 | 12/2003 | Hsieh et al. |
| 6,670,055 B2 | 12/2003 | Tomiyasu et al. |
| 6,682,807 B2 | 1/2004 | Lairson et al. |
| 6,683,754 B2 | 1/2004 | Suzuki et al. |
| 6,716,516 B2 | 4/2004 | Futamoto et al. |
| 6,730,420 B1 | 5/2004 | Bertero et al. |
| 6,743,528 B2 | 6/2004 | Suekane et al. |
| 6,759,138 B2 | 7/2004 | Tomiyasu et al. |
| 6,778,353 B1 | 8/2004 | Harper |
| 6,795,274 B1 | 9/2004 | Hsieh et al. |
| 6,830,824 B2 | 12/2004 | Kikitsu et al. |
| 6,834,026 B2 | 12/2004 | Fullerton et al. |
| 6,855,232 B2 | 2/2005 | Jairson et al. |
| 6,857,937 B2 | 2/2005 | Bajorek |
| 6,881,495 B2 | 4/2005 | Kikitsu et al. |
| 6,881,496 B2 | 4/2005 | Okamoto |
| 6,881,497 B2 | 4/2005 | Coffey et al. |
| 6,893,748 B2 | 5/2005 | Bertero et al. |
| 6,899,959 B2 | 5/2005 | Bertero et al. |
| 6,916,558 B2 | 7/2005 | Umezawa et al. |
| 6,939,120 B1 | 9/2005 | Harper |
| 6,946,191 B2 | 9/2005 | Morikawa et al. |
| 6,967,798 B2 | 11/2005 | Homola et al. |
| 6,972,135 B2 | 12/2005 | Homola |
| 7,004,827 B1 | 2/2006 | Suzuki et al. |
| 7,006,323 B1 | 2/2006 | Suzuki |
| 7,016,154 B2 | 3/2006 | Nishihira |
| 7,019,924 B2 | 3/2006 | McNeil et al. |
| 7,045,215 B2 | 5/2006 | Shimokawa |
| 7,070,870 B2 | 7/2006 | Bertero et al. |
| 7,081,309 B2 | 7/2006 | Do et al. |
| 7,090,934 B2 | 8/2006 | Hokkyo et al. |
| 7,099,112 B1 | 8/2006 | Harper |
| 7,105,241 B2 | 9/2006 | Shimokawa et al. |
| 7,119,990 B2 | 10/2006 | Bajorek et al. |
| 7,147,790 B2 | 12/2006 | Wachenschwanz et al. |
| 7,161,753 B2 | 1/2007 | Wachenschwanz et al. |
| 7,166,319 B2 | 1/2007 | Ishiyama |
| 7,166,374 B2 | 1/2007 | Suekane et al. |
| 7,169,487 B2 | 1/2007 | Kawai et al. |
| 7,174,775 B2 | 2/2007 | Ishiyama |
| 7,179,549 B2 | 2/2007 | Malhotra et al. |
| 7,184,139 B2 | 2/2007 | Treves et al. |
| 7,196,860 B2 | 3/2007 | Alex |
| 7,199,977 B2 | 4/2007 | Suzuki et al. |
| 7,208,236 B2 | 4/2007 | Morikawa et al. |
| 7,220,500 B1 | 5/2007 | Tomiyasu et al. |
| 7,229,266 B2 | 6/2007 | Harper |
| 7,239,970 B2 | 7/2007 | Treves et al. |
| 7,241,517 B2 * | 7/2007 | Acharya et al. ............... 428/829 |
| 7,252,897 B2 | 8/2007 | Shimokawa et al. |
| 7,277,254 B2 | 10/2007 | Shimokawa et al. |
| 7,281,920 B2 | 10/2007 | Homola et al. |
| 7,292,329 B2 | 11/2007 | Treves et al. |
| 7,301,726 B1 | 11/2007 | Suzuki |
| 7,302,148 B2 | 11/2007 | Treves et al. |
| 7,305,119 B2 | 12/2007 | Treves et al. |
| 7,314,404 B2 | 1/2008 | Singh et al. |
| 7,320,584 B1 | 1/2008 | Harper et al. |
| 7,329,114 B2 | 2/2008 | Harper et al. |
| 7,375,362 B2 | 5/2008 | Treves et al. |
| 7,384,699 B2 | 6/2008 | Nolan et al. |
| 7,420,886 B2 | 9/2008 | Tomiyasu et al. |
| 7,425,377 B2 | 9/2008 | Fullerton et al. |
| 7,425,719 B2 | 9/2008 | Treves et al. |
| 7,435,489 B2 | 10/2008 | Umeda et al. |
| 7,471,484 B2 | 12/2008 | Wachenschwanz et al. |
| 7,488,545 B2 | 2/2009 | Fullerton et al. |
| 7,498,062 B2 | 3/2009 | Calcaterra et al. |
| 7,531,485 B2 | 5/2009 | Hara et al. |
| 7,537,846 B2 | 5/2009 | Ishiyama et al. |
| 7,549,209 B2 | 6/2009 | Wachenschwanz et al. |
| 7,550,210 B2 | 6/2009 | Berger et al. |
| 7,556,870 B2 | 7/2009 | Do et al. |
| 7,569,490 B2 | 8/2009 | Staud |
| 7,572,526 B2 | 8/2009 | Berger et al. |
| 7,582,368 B2 | 9/2009 | Berger et al. |
| 7,597,792 B2 | 10/2009 | Homola et al. |
| 7,597,973 B2 | 10/2009 | Ishiyama |
| 7,608,193 B2 | 10/2009 | Wachenschwanz et al. |
| 7,625,643 B2 | 12/2009 | Umeda et al. |
| 7,632,087 B2 | 12/2009 | Homola |
| 7,638,210 B2 | 12/2009 | Berger et al. |
| 7,656,615 B2 | 2/2010 | Wachenschwanz et al. |
| 7,682,546 B2 | 3/2010 | Harper |
| 7,684,152 B2 | 3/2010 | Suzuki et al. |
| 7,686,606 B2 | 3/2010 | Harper et al. |
| 7,686,991 B2 | 3/2010 | Harper |
| 7,695,833 B2 | 4/2010 | Ishiyama |
| 7,722,968 B2 | 5/2010 | Ishiyama |
| 7,733,605 B2 | 6/2010 | Suzuki et al. |
| 7,736,768 B2 | 6/2010 | Ishiyama |
| 7,736,769 B2 | 6/2010 | Ajan |
| 7,755,861 B1 | 7/2010 | Li et al. |
| 7,758,732 B1 | 7/2010 | Calcaterra et al. |
| 7,833,639 B2 | 11/2010 | Sonobe et al. |
| 7,833,641 B2 | 11/2010 | Tomiyasu et al. |
| 7,846,563 B2 * | 12/2010 | Berger et al. ............... 428/827 |
| 7,910,159 B2 | 3/2011 | Jung |
| 7,911,736 B2 | 3/2011 | Bajorek |
| 7,924,519 B2 | 4/2011 | Lambert |
| 7,944,165 B1 | 5/2011 | O'Dell |
| 7,944,643 B1 | 5/2011 | Jiang et al. |
| 7,955,723 B2 | 6/2011 | Umezawa et al. |
| 7,983,003 B2 | 7/2011 | Sonobe et al. |
| 7,993,497 B2 | 8/2011 | Moroishi et al. |
| 7,993,765 B2 | 8/2011 | Kim et al. |
| 7,998,912 B2 | 8/2011 | Chen et al. |
| 8,002,901 B1 | 8/2011 | Chen et al. |
| 8,003,237 B2 | 8/2011 | Sonobe et al. |
| 8,012,920 B2 | 9/2011 | Shimokawa |
| 8,038,863 B2 | 10/2011 | Homola |
| 8,057,926 B2 | 11/2011 | Ayama et al. |
| 8,062,778 B2 | 11/2011 | Suzuki et al. |
| 8,064,156 B1 | 11/2011 | Suzuki et al. |
| 8,076,013 B2 | 12/2011 | Sonobe et al. |
| 8,092,931 B2 | 1/2012 | Ishiyama et al. |
| 8,100,685 B1 | 1/2012 | Harper et al. |
| 8,101,054 B2 | 1/2012 | Chen et al. |
| 8,125,723 B1 | 2/2012 | Nichols et al. |
| 8,125,724 B1 | 2/2012 | Nichols et al. |
| 8,137,517 B1 | 3/2012 | Bourez |
| 8,142,916 B2 | 3/2012 | Umezawa et al. |
| 8,163,093 B1 | 4/2012 | Chen et al. |
| 8,171,949 B1 | 5/2012 | Lund et al. |
| 8,173,282 B1 | 5/2012 | Sun et al. |
| 8,178,480 B2 | 5/2012 | Hamakubo et al. |
| 8,206,789 B2 | 6/2012 | Suzuki |

(56) References Cited

U.S. PATENT DOCUMENTS

| | | |
|---|---|---|
| 8,218,260 B2 | 7/2012 | Iamratanakul et al. |
| 8,241,766 B2 * | 8/2012 | Lu et al. .................... 428/828.1 |
| 8,247,095 B2 | 8/2012 | Champion et al. |
| 8,257,783 B2 | 9/2012 | Suzuki et al. |
| 8,298,609 B1 | 10/2012 | Liew et al. |
| 8,298,689 B2 | 10/2012 | Sonobe et al. |
| 8,309,239 B2 | 11/2012 | Umezawa et al. |
| 8,316,668 B1 | 11/2012 | Chan et al. |
| 8,331,056 B2 | 12/2012 | O'Dell |
| 8,354,618 B1 | 1/2013 | Chen et al. |
| 8,367,228 B2 | 2/2013 | Sonobe et al. |
| 8,383,209 B2 | 2/2013 | Ayama |
| 8,394,243 B1 | 3/2013 | Jung et al. |
| 8,397,751 B1 | 3/2013 | Chan et al. |
| 8,399,809 B1 | 3/2013 | Bourez |
| 8,402,638 B1 | 3/2013 | Treves et al. |
| 8,404,056 B1 | 3/2013 | Chen et al. |
| 8,404,369 B2 | 3/2013 | Ruffini et al. |
| 8,404,370 B2 | 3/2013 | Sato et al. |
| 8,406,918 B2 | 3/2013 | Tan et al. |
| 8,414,966 B2 | 4/2013 | Yasumori et al. |
| 8,425,975 B2 | 4/2013 | Ishiyama |
| 8,431,257 B2 | 4/2013 | Kim et al. |
| 8,431,258 B2 | 4/2013 | Onoue et al. |
| 8,453,315 B2 | 6/2013 | Kajiwara et al. |
| 8,488,276 B1 | 7/2013 | Jung et al. |
| 8,491,800 B1 | 7/2013 | Dorsey |
| 8,492,009 B1 | 7/2013 | Homola et al. |
| 8,492,011 B2 | 7/2013 | Itoh et al. |
| 8,496,466 B1 | 7/2013 | Treves et al. |
| 8,517,364 B1 | 8/2013 | Crumley et al. |
| 8,517,657 B2 | 8/2013 | Chen et al. |
| 8,524,052 B1 | 9/2013 | Tan et al. |
| 8,530,065 B1 | 9/2013 | Chernyshov et al. |
| 8,546,000 B2 | 10/2013 | Umezawa |
| 8,551,253 B2 | 10/2013 | Na'Im et al. |
| 8,551,627 B2 | 10/2013 | Shimada et al. |
| 8,556,566 B1 | 10/2013 | Suzuki et al. |
| 8,559,131 B2 | 10/2013 | Masuda et al. |
| 8,562,748 B1 | 10/2013 | Chen et al. |
| 8,565,050 B1 | 10/2013 | Bertero et al. |
| 8,570,844 B1 | 10/2013 | Yuan et al. |
| 8,580,410 B2 | 11/2013 | Onoue |
| 8,584,687 B1 | 11/2013 | Chen et al. |
| 8,591,709 B1 | 11/2013 | Lim et al. |
| 8,592,061 B2 | 11/2013 | Onoue et al. |
| 8,596,287 B1 | 12/2013 | Chen et al. |
| 8,597,723 B1 | 12/2013 | Jung et al. |
| 8,603,649 B2 | 12/2013 | Onoue |
| 8,603,650 B2 | 12/2013 | Sonobe et al. |
| 8,605,388 B2 | 12/2013 | Yasumori et al. |
| 8,605,555 B1 | 12/2013 | Chernyshov et al. |
| 8,608,147 B1 | 12/2013 | Yap et al. |
| 8,609,263 B1 | 12/2013 | Chernyshov et al. |
| 8,619,381 B2 | 12/2013 | Moser et al. |
| 8,623,528 B2 | 1/2014 | Umezawa et al. |
| 8,623,529 B2 | 1/2014 | Suzuki |
| 8,634,155 B2 | 1/2014 | Yasumori et al. |
| 8,658,003 B1 | 2/2014 | Bourez |
| 8,658,292 B1 | 2/2014 | Mallary et al. |
| 8,665,541 B2 | 3/2014 | Saito |
| 8,668,953 B1 | 3/2014 | Buechel-Rimmel |
| 8,674,327 B1 | 3/2014 | Poon et al. |
| 8,685,214 B1 | 4/2014 | Moh et al. |
| 8,696,404 B2 | 4/2014 | Sun et al. |
| 8,711,499 B1 | 4/2014 | Desai et al. |
| 8,743,666 B1 | 6/2014 | Bertero et al. |
| 8,758,912 B2 | 6/2014 | Srinivasan et al. |
| 8,787,124 B1 | 7/2014 | Chernyshov et al. |
| 8,787,130 B1 | 7/2014 | Yuan et al. |
| 8,791,391 B2 | 7/2014 | Bourez |
| 8,795,765 B2 | 8/2014 | Koike et al. |
| 8,795,790 B2 | 8/2014 | Sonobe et al. |
| 8,795,857 B2 | 8/2014 | Ayama et al. |
| 8,800,322 B1 | 8/2014 | Chan et al. |
| 8,811,129 B1 | 8/2014 | Yuan et al. |
| 8,817,410 B1 | 8/2014 | Moser et al. |
| 2002/0060883 A1 | 5/2002 | Suzuki |
| 2003/0022024 A1 | 1/2003 | Wachenschwanz |
| 2003/0108721 A1 | 6/2003 | Fullerton et al. |
| 2003/0162041 A1 | 8/2003 | Nemoto et al. |
| 2004/0013910 A1 * | 1/2004 | Acharya et al. ......... 428/694 ST |
| 2004/0022387 A1 | 2/2004 | Weikle |
| 2004/0132301 A1 | 7/2004 | Harper et al. |
| 2004/0202793 A1 | 10/2004 | Harper et al. |
| 2004/0202865 A1 | 10/2004 | Homola et al. |
| 2004/0209123 A1 | 10/2004 | Bajorek et al. |
| 2004/0209470 A1 | 10/2004 | Bajorek |
| 2005/0036223 A1 | 2/2005 | Wachenschwanz et al. |
| 2005/0142990 A1 | 6/2005 | Homola |
| 2005/0150862 A1 | 7/2005 | Harper et al. |
| 2005/0151282 A1 | 7/2005 | Harper et al. |
| 2005/0151283 A1 | 7/2005 | Bajorek et al. |
| 2005/0151300 A1 | 7/2005 | Harper et al. |
| 2005/0155554 A1 | 7/2005 | Saito |
| 2005/0167867 A1 | 8/2005 | Bajorek et al. |
| 2005/0263401 A1 | 12/2005 | Olsen et al. |
| 2006/0024432 A1 * | 2/2006 | Nolan et al. .................... 427/128 |
| 2006/0147758 A1 | 7/2006 | Jung et al. |
| 2006/0166039 A1 | 7/2006 | Berger et al. |
| 2006/0177704 A1 | 8/2006 | Berger et al. |
| 2006/0181697 A1 | 8/2006 | Treves et al. |
| 2006/0204791 A1 * | 9/2006 | Sakawaki et al. .......... 428/828.1 |
| 2006/0207890 A1 | 9/2006 | Staud |
| 2007/0070549 A1 | 3/2007 | Suzuki et al. |
| 2007/0231609 A1 | 10/2007 | Ajan et al. |
| 2007/0243418 A1 * | 10/2007 | Fullerton et al. ............... 428/828 |
| 2007/0245909 A1 | 10/2007 | Homola |
| 2007/0292720 A1 | 12/2007 | Suess |
| 2008/0075845 A1 | 3/2008 | Sonobe et al. |
| 2008/0093760 A1 | 4/2008 | Harper et al. |
| 2008/0144213 A1 * | 6/2008 | Berger et al. .................. 360/110 |
| 2008/0180843 A1 | 7/2008 | Zhang et al. |
| 2008/0292907 A1 * | 11/2008 | Berger et al. .................. 428/828 |
| 2008/0311430 A1 | 12/2008 | Chen et al. |
| 2009/0110961 A1 * | 4/2009 | Shibata et al. ................ 428/828 |
| 2009/0117408 A1 | 5/2009 | Umezawa et al. |
| 2009/0136784 A1 | 5/2009 | Suzuki et al. |
| 2009/0169922 A1 | 7/2009 | Ishiyama |
| 2009/0191331 A1 | 7/2009 | Umezawa et al. |
| 2009/0202866 A1 | 8/2009 | Kim et al. |
| 2009/0290256 A1 | 11/2009 | Berger et al. |
| 2009/0311557 A1 | 12/2009 | Onoue et al. |
| 2010/0062286 A1 | 3/2010 | Suess |
| 2010/0128391 A1 | 5/2010 | Berger et al. |
| 2010/0143752 A1 | 6/2010 | Ishibashi et al. |
| 2010/0190035 A1 | 7/2010 | Sonobe et al. |
| 2010/0196619 A1 | 8/2010 | Ishiyama |
| 2010/0196740 A1 | 8/2010 | Ayama et al. |
| 2010/0209601 A1 | 8/2010 | Shimokawa et al. |
| 2010/0209737 A1 * | 8/2010 | Bian et al. ..................... 428/827 |
| 2010/0215992 A1 | 8/2010 | Horikawa et al. |
| 2010/0232065 A1 | 9/2010 | Suzuki et al. |
| 2010/0247965 A1 | 9/2010 | Onoue |
| 2010/0261039 A1 | 10/2010 | Itoh et al. |
| 2010/0279151 A1 | 11/2010 | Sakamoto et al. |
| 2010/0300884 A1 | 12/2010 | Homola et al. |
| 2010/0304186 A1 | 12/2010 | Shimokawa |
| 2011/0097603 A1 | 4/2011 | Onoue |
| 2011/0097604 A1 | 4/2011 | Onoue |
| 2011/0171495 A1 | 7/2011 | Tachibana et al. |
| 2011/0206947 A1 | 8/2011 | Tachibana et al. |
| 2011/0212346 A1 | 9/2011 | Onoue et al. |
| 2011/0223446 A1 | 9/2011 | Onoue et al. |
| 2011/0244119 A1 | 10/2011 | Umezawa et al. |
| 2011/0299194 A1 | 12/2011 | Aniya et al. |
| 2011/0311841 A1 | 12/2011 | Saito et al. |
| 2012/0069466 A1 | 3/2012 | Okamoto et al. |
| 2012/0070692 A1 | 3/2012 | Sato et al. |
| 2012/0077060 A1 | 3/2012 | Ozawa |
| 2012/0127599 A1 | 5/2012 | Shimokawa et al. |
| 2012/0127601 A1 | 5/2012 | Suzuki et al. |
| 2012/0129009 A1 | 5/2012 | Sato et al. |
| 2012/0140359 A1 | 6/2012 | Tachibana |

(56) References Cited

U.S. PATENT DOCUMENTS

| | | |
|---|---|---|
| 2012/0141833 A1 | 6/2012 | Umezawa et al. |
| 2012/0141835 A1 | 6/2012 | Sakamoto |
| 2012/0148875 A1 | 6/2012 | Hamakubo et al. |
| 2012/0156523 A1 | 6/2012 | Seki et al. |
| 2012/0164488 A1 | 6/2012 | Shin et al. |
| 2012/0170152 A1 | 7/2012 | Sonobe et al. |
| 2012/0171369 A1 | 7/2012 | Koike et al. |
| 2012/0175243 A1 | 7/2012 | Fukuura et al. |
| 2012/0189872 A1 | 7/2012 | Umezawa et al. |
| 2012/0196049 A1 | 8/2012 | Azuma et al. |
| 2012/0207919 A1 | 8/2012 | Sakamoto et al. |
| 2012/0219827 A1* | 8/2012 | Kim et al. ............... 428/828.1 |
| 2012/0225217 A1 | 9/2012 | Itoh et al. |
| 2012/0251842 A1 | 10/2012 | Yuan et al. |
| 2012/0251846 A1 | 10/2012 | Desai et al. |
| 2012/0276417 A1 | 11/2012 | Shimokawa et al. |
| 2012/0308722 A1 | 12/2012 | Suzuki et al. |
| 2013/0040167 A1 | 2/2013 | Alagarsamy et al. |
| 2013/0071694 A1 | 3/2013 | Srinivasan et al. |
| 2013/0165029 A1 | 6/2013 | Sun et al. |
| 2013/0175252 A1 | 7/2013 | Bourez |
| 2013/0216865 A1 | 8/2013 | Yasumori et al. |
| 2013/0230647 A1 | 9/2013 | Onoue et al. |
| 2013/0314815 A1 | 11/2013 | Yuan et al. |
| 2014/0011054 A1 | 1/2014 | Suzuki |
| 2014/0044992 A1 | 2/2014 | Onoue |
| 2014/0050843 A1 | 2/2014 | Yi et al. |
| 2014/0151360 A1 | 6/2014 | Gregory et al. |
| 2014/0234666 A1 | 8/2014 | Knigge et al. |

OTHER PUBLICATIONS

Victora, R. H. and Xiao Shen, Exchange Coupled Composite Media, IEEE, Conference-Related Paper, Aug. 15, 2007, pp. 1-9.

Kirby, B.J., J.E. Davies, Kai Liu, S.M. Watson, G.T. Zimanyi, R.D. Shull, P.A. Kienzle and J.A. Borches, Vertically Graded Anisotropy in Co/Pd Multilayers, Physics Department, University of California, Davis, CA, pp. 1-16.

Suess, D., T. Schrefl and D. Shin, Optimizing Graded Perpendicular Media, University of California, Davis, California, pp. 1-14.

Suess, D., G. Winkler, J. Fidler, A. Bashir and T. Schrefl, Concepts of Magnetic 3D and Multilayer Recording, Vienna University of Technology, Vienna, Austria and The University of Sheffield, Sheffield, UK, pp. 1-34.

Victora, R.H. et al. (2007). "Exchange Couple Composite Media," IEEE, 9 pages.

Johannes Van EK, U.S. Appl. No. 12/978,225, filed Dec. 23, 2010, 19 pages.

* cited by examiner

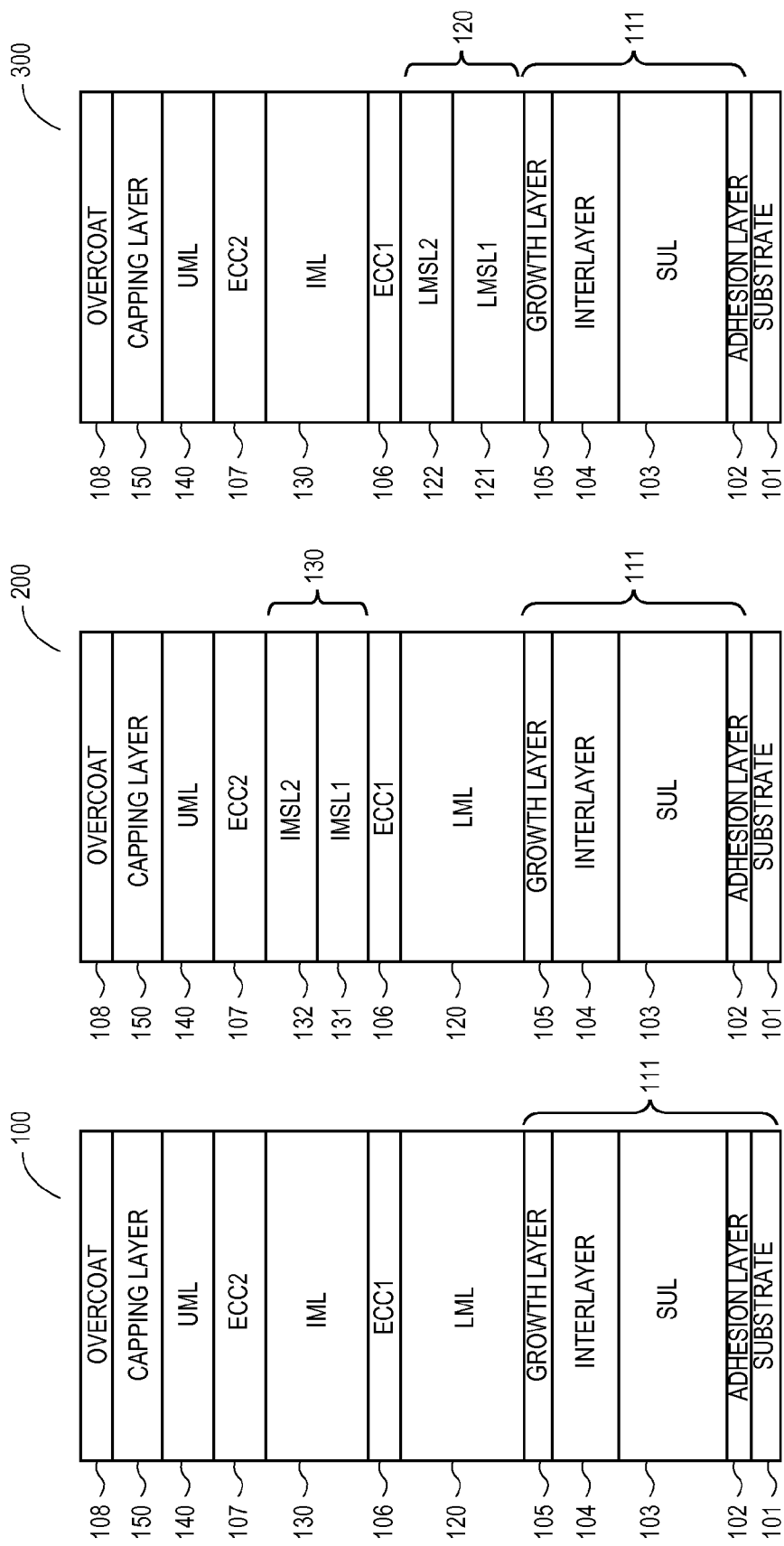

RECORDING MEDIA WITH MULTIPLE EXCHANGE COUPLED MAGNETIC LAYERS

TECHNICAL FIELD

Embodiments described herein relate to the field of disk drives, and, in particularly, to perpendicular magnetic recording disks with multiple exchange coupled magnetic layers.

BACKGROUND

In perpendicular magnetic recording (PMR) media with an areal density of 500 Gigabits per square inch (Gb/in$^2$) and beyond, signal to noise ratio (SNR) and write-ability overwrite (OW2) improvements are becoming more and more difficult to realize. While both SNR and OW2 improve when the media is made magnetically softer, the magnetically softer media also results in wider written tracks that degrade adjacent track performance in a drive system.

In order to improve SNR and OW2 without widening written tracks, media structures with dual magnetic recording layers have been explored and discussed, for example, in U.S. Pat. No. 7,488,545 B2 to Fullerton et al. (hereinafter "Fullerton"). In Fullerton, a media structure with two decoupled recording layers is described. The effect of this decoupling of the two recording layers is to double the effective number of grains per unit area in the media. As a result, the SNR of the media is improved because SNR is dependent on the number of grains per unit area.

BRIEF DESCRIPTION OF THE DRAWINGS

The present invention is illustrated by way of example, and not limitation, in the figures of the accompanying drawings in which:

FIG. 1 illustrates a cross sectional view of a PMR disk according to one embodiment of the present invention.

FIG. 2 illustrates a cross sectional view of a PMR disk according to another embodiment of the present invention.

FIG. 3 illustrates a cross sectional view of a PMR disk according to a further embodiment of the present invention.

DETAILED DESCRIPTION

In the following description, numerous specific details are set forth, such as examples of specific layer compositions and properties, to provide a thorough understanding of various embodiment of the present invention. It will be apparent, however, to one skilled in the art that these specific details need not be employed to practice various embodiments of the present invention. In other instances, well known components or methods have not been described in detail to avoid unnecessarily obscuring various embodiments of the present invention.

Embodiments of a perpendicular magnetic recording (PMR) disk are described. The PMR disk structure includes a magnetic capping layer being substantially free of an oxide, an upper magnetic layer disposed directly below and in contact with the magnetic capping layer, and an upper exchange coupling layer disposed below the upper magnetic layer. The upper magnetic layer includes an oxide material. The PMR disk structure may also include an intermediate magnetic layer disposed below the upper exchange coupling layer, a lower exchange coupling layer disposed below the intermediate magnetic later, and a lower magnetic layer disposed between the lower exchange coupling layer and a substrate. In one embodiment, a combination of these layers forms a triple magnetic layer structure that may have improved signal-to-noise ratio (SNR) and/or improved write-ability overwrite (OW2) without widening the track width or lowering the thermal stability of the media.

FIG. 1 illustrates a cross-sectional view of one embodiment of a PMR disk 100. The PMR disk 100 has a structure that includes at least the following layers in descending order from the top of the PMR disk 100: a magnetic capping layer 150, an upper magnetic layer (UML) 140 in direct contact with and below the magnetic capping layer 150, an upper exchange coupling layer (ECC2) 107, an intermediate magnetic layer (IML) 130, a lower exchange coupling layer (ECC1) 106, a lower magnetic layer (LML) 120, and a substrate 101. The material used for the UML 140 is a well segregated material and has an inter-granular exchange coupling lower than that of the magnetic capping layer 150. To enhance grain segregation and reduce inter-granular exchange coupling, the UML 140 includes an oxide material, whereas the material used in the magnetic capping layer 150 is substantially free of an oxide. By substantially free of an oxide, it is meant that trace amounts of impurities containing an oxide may nevertheless be present in the magnetic capping layer 150.

Figure 5:
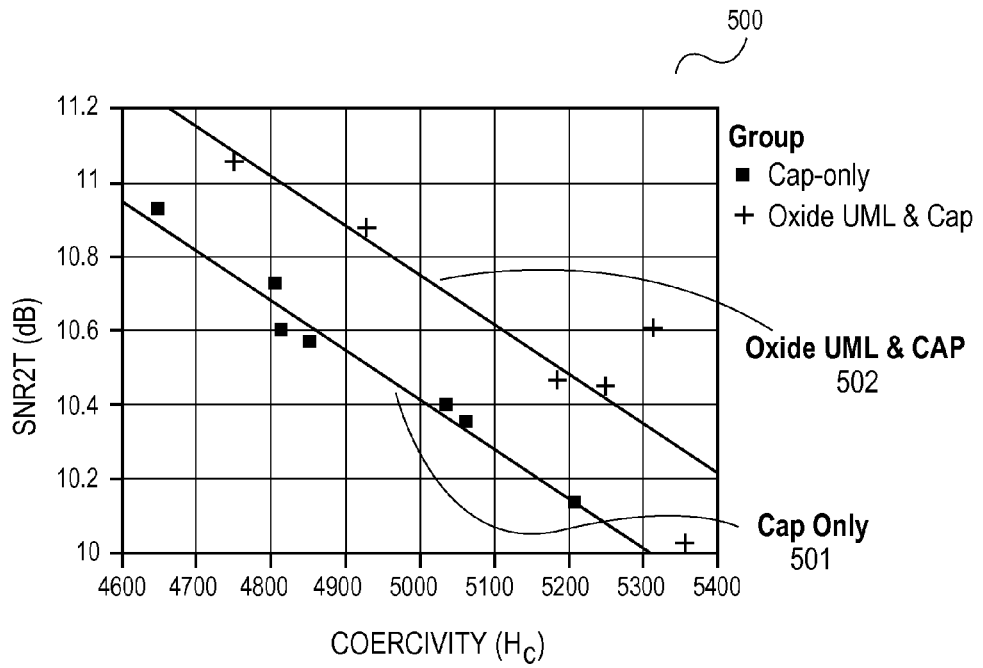
FIG. 5 illustrates the signal-to-noise ratio (SNR) performance of a PMR disk according to one embodiment of the present invention.
Figure 6:
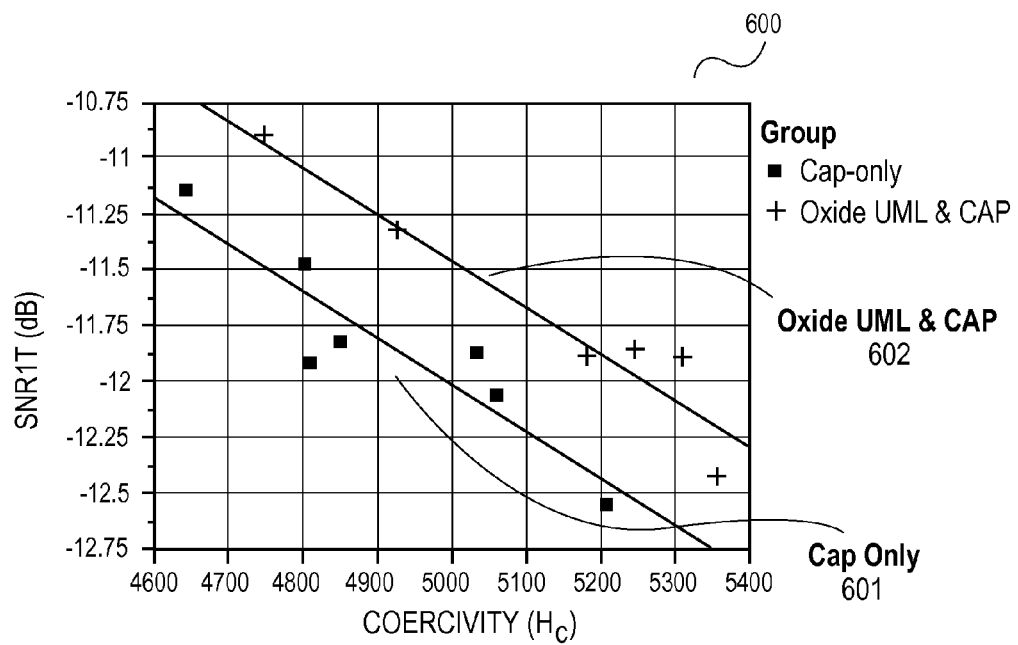
FIG. 6 illustrates another signal-to-noise ratio (SNR) performance of a PMR disk according to one embodiment of the present invention.

The presence of an UML 140 with an oxide material improves high frequency signal-to-noise ratio (SNR) in the media. FIG. 5 shows a comparison of SNR performances 500 at 2 T of a recording medium having only two decoupled recording layers and a capping layer against a recording medium in accordance with one embodiment of the invention that has three magnetic layers including the UML 140 and a magnetic capping layer 150. FIG. 6 shows a comparison of SNR performances 600 at 1 T of the same two recording media. "T" denotes the period of the highest frequency. As shown in FIG. 5, the presence of UML 140 with an oxide material improves the SNR performance 502 at 2 T by approximately 0.4 dB over the SNR performance 501 of the recording medium with only a capping layer. As shown in FIG. 6, the presence of UML 140 with an oxide material improves the SNR performance 602 at 1 T by approximately 0.5 dB over the SNR performance 601 of the recording medium with only a capping layer. The gain in high frequency SNRs translates to improved on-track SNR and better error rates, as well as better adjacent track interference characteristics.

The improvement in SNR can be attributed to the addition of the oxide material in the UML 140. One factor that affects SNR is how well grains are segregated in the magnetic material. A well-segregated material reduces intrinsic media noise and hence improves SNR. A well-segregated material also yields a reduction in inter-granular exchange coupling, which in turn reduces bit shifts that can occur between adjacent grains in a material with high inter-granular exchange coupling. Some oxides in magnetic materials have a tendency to segregate to grain boundaries. The oxide additive chosen in the upper magnetic layer 140 has a tendency to settle along grain boundaries. As a result of the presence of oxides along grain boundaries, the segregation of grains is enhanced and the inter-granular exchange coupling between adjacent grains is reduced in the UML 140 to provide better SNR performance.

Inter-granular exchange coupling can be quantified by the coercivity squareness (S*) parameter from the hysteresis loop of a magnetic material as measured by a vibrating sample magnetometer (VSM) or by Polar Kerr methods well known in the art. The S* parameter is inversely related to the slope of the hysteresis loop. A higher S* indicates greater lateral exchange coupling. When comparing to one embodiment of the invention that has UML 140 with an oxide additive directly below the magnetic capping layer 150, a recording medium that lacks UML 140 has a S* parameter that is 0.1 higher. Hence, the presence of UML 140 with an oxide material yields lower inter-granular exchange coupling than a recording medium without UML 140.

Although an oxide additive in the UML 140 provides better SNR performance, an oxide additive in the magnetic capping layer 150 may not offer the same performance advantages. Moreover, having an oxide additive in the magnetic capping layer 150 also makes the magnetic capping layer 150 more susceptible to surface corrosion, even when an additional overcoat layer is present above the magnetic capping layer 150. Thus, in order to maintain the longevity of the recording media, an oxide additive is not added to the magnetic capping layer 150, but, rather, is added to the UML 140.

To further increase SNR and related performance metrics, the oxide content in the UML 140 can be increased. At a given coercivity, a material with a higher oxide content used in the UML 140 yields higher SNRs. The improvement in SNR by increasing the oxide content is advantageous up until a point when the presence of the oxide starts to put a limit on the areal density of the magnetic grains. Beyond that point, increasing the oxide content may start to hamper the areal density of the recording media.

Figure 7A:
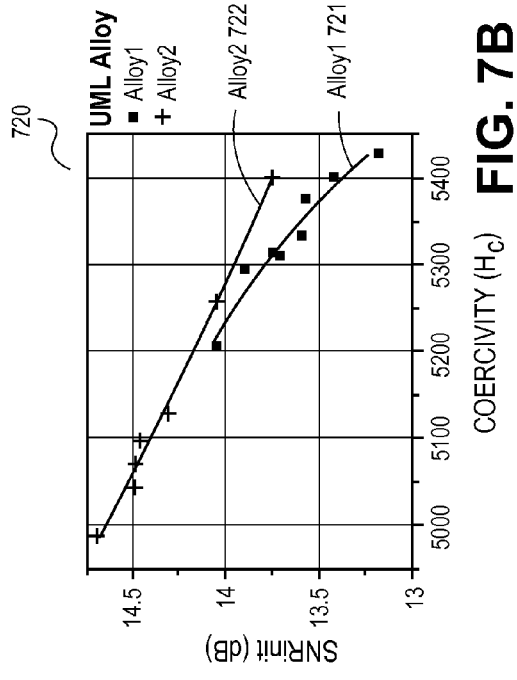
FIG. 7A illustrates the effects of oxide content on the squeeze (Sqz) parameter of a PMR disk according to one embodiment of the present invention.
Figure 7B:
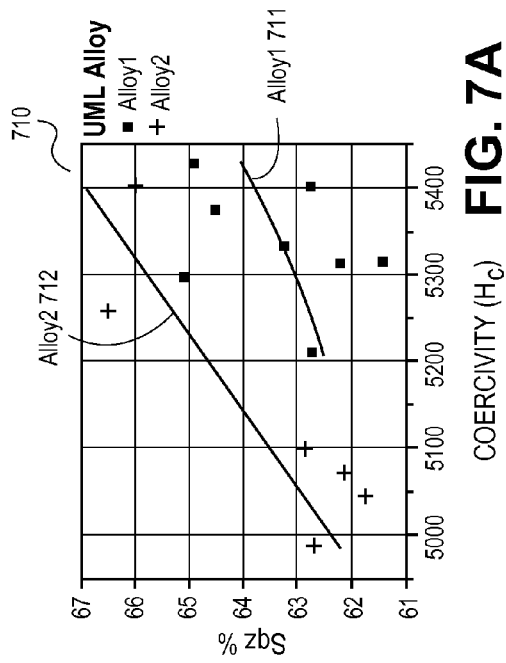
FIG. 7B illustrates the effects of oxide content on the on-track signal-to-noise ratio (SNRinit) performance of a PMR disk according to one embodiment of the present invention.
Figure 7C:
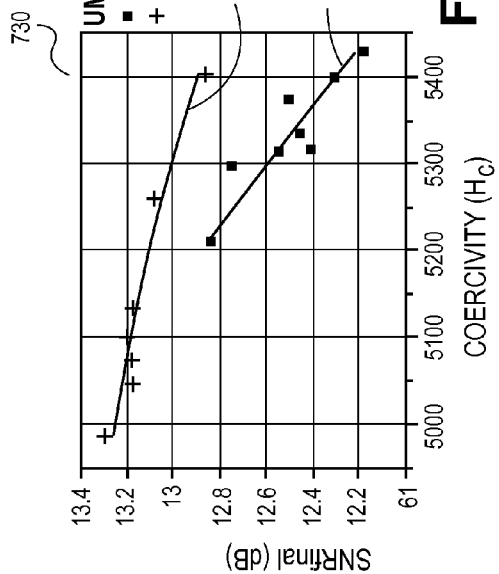
FIG. 7C illustrates the effects of oxide content on the adjacent track signal-to-noise ratio (SNRfinal) performance of a PMR disk according to one embodiment of the present invention.

FIGS. 7A-C compares the squeeze (Sqz) parameters 710, the on-track SNRs (SNRinit) 720, and the adjacent track SNRs (SNRfinal) 730 as a function of coercivity between embodiments of the present invention having different amount of oxide content in UML 140. The squeeze parameter is a SNR related performance parameter that measures a recoding system's ability to reproduce recorded data on a test track in the presence of other information in adjacent tracks as the adjacent tracks are brought in closer and closer to the test track. The UML 140 in one embodiment, denoted by the square sample points and extrapolated curves 711, 721, and 731, is made of an Alloy1 material, which contains 18% oxygen. More specifically, Alloy1 is made of a cobalt-chromium-platinum alloy with titanium oxide and cobalt oxide additives having a composition of Co-15Cr-14PT-(6 Mol % TiO$_2$)-(10 Mol % CoO). The UML 140 in the other embodiment, denoted by the crosshair sample points and extrapolated curves 712, 722, and 732, is made of an Alloy2 material, which contains 19.4% oxygen. More specifically, Alloy2 is made of a cobalt-chromium-platinum alloy with titanium oxide and cobalt oxide additives having a composition of Co-14Cr-16Pt-(8 Mol % TiO2)-(8 Mol % CoO). As FIG. 7 illustrates, the embodiment with an UML 140 made of Alloy2, which has a higher oxide content, yields better performance over the Alloy1 embodiment in each of the performance parameters of Sqz, SNRinit, and SNRfinal. For example, at a given coercivity of 5400 Oersted, the Alloy2 embodiment is able to achieve a Sqz performance 712 that is almost 3% higher than the Sqz performance 711 of the Alloy1 embodiment. The Alloy2 embodiment is also able to achieve a SNRinit performance 722 that is about 0.3 dB higher than the SNRinit performance 721 of the Alloy1 embodiment, and a SNRfinal performance 732 that is 0.6 dB higher than the SNRfinal performance 731 of the Alloy1 embodiment.

Referring back to FIG. 1, in one embodiment, the UML 140 may have a thickness in a range from 0.5 nanometers (nm) to 5 nm and is thinner than the magnetic capping layer, which may have a thickness in a range of 3.5 nm to 5 nm. The oxide material in the UML 140 may be titanium oxide (TiO$_2$) or cobalt oxide (CoO). In an alternative embodiment, another oxide material such as chromium oxide (Cr$_2$O$_3$) or silicon dioxide (SiO$_2$) or a combination of other oxide materials may be used in UML 140. The oxide material in UML 140 may have a molar volume in the range of 5% to 30% of the total molar volume of the UML 140. The intermediate magnetic layer (IML) 130 and the lower magnetic layer (LML) 120 may also both have an oxide additive. In another embodiment, either one or none of the IML 130 and the LML 120 may have an oxide additive.

In one embodiment, the UML 140 has an anisotropy field ($H_k$) in a range of 10 kilo-Oersteds (kOe) to 20 kOe. The $H_k$ of the UML 140 may be equivalent to the $H_k$ of the IML 130. The $H_k$ of the magnetic capping layer 150 may be less than or equal to the $H_k$ of the UML 140. In another embodiment, the magnetic capping layer 150 is a soft magnetic layer with a coercivity ($H_c$) lower than that of the UML 140 and has an inter-granular exchange coupling higher than the IML 130.

FIG. 2 shows a cross-sectional view of an alternative embodiment of a PMR disk 200. With the exception of the intermediate magnetic layer (IML) 130, the other layers in the PMR disk 200 are similar to that of the PMR disk 100 of FIG. 1. As such, a discussion of these other layers and their characteristics in relation to each other are not repeated. In one embodiment of the structure of PMR disk 200, the IML 130 includes a first intermediate magnetic sub-layer (IMSL1) 131 and a second intermediate magnetic sub-layer (IMSL2) 132 disposed above the first intermediate magnetic sub-layer (IMSL1) 131. Each of the magnetic sub-layers IMSL1 131 and IMSL2 132 may have a different anisotropy field ($H_K$) and may have a thickness between 1 nm to 5 nm. Each of the magnetic sub-layers IMSL1 131 and IMSL2 132 may have a large inter-granular exchange coupling. The inter-granular exchange coupling in the IMSL2 132 may be greater than the inter-granular exchange coupling in the IMSL1 131.

In one embodiment, the IMSL2 132 has a $H_k$ that is less than the $H_k$ of the IMSL1 131. The $H_k$ of the IMSL1 131 may be less than or equal to the $H_k$ of LML 120. In a particular embodiment, the $H_k$ of the IMSL1 131 is in a range of 7 kilo-Oersted (kOe) to 20 kOe. The $H_k$ of the LML 120 may be greater than or equal to the $H_k$ of the IMSL1 131. In an alternative embodiment, either the IMSL1 131 or the IMSL2

132 may have a higher $H_k$. The IML 130 may also have a gradient $H_k$ increasing from the top of the layer to the bottom of the layer, with the bottom of the layer having the highest $H_k$ within the layer.

In one embodiment, the IMSL2 132 is substantially free of an oxide, meaning that trace amounts of impurities containing an oxide may nevertheless be present in the IMSL2 132. The material used in the IMSL1 131 may include an oxide material such as titanium oxide ($TiO_2$) or cobalt oxide (CoO). In an alternative embodiment, another oxide material such as chromium oxide ($Cr_2O_3$) or silicon dioxide ($SiO_2$) or a combination of other oxide materials may be used in the IMSL1 131. The oxide material in the IMSL1 131 may have a molar volume in the range of 5% to 30% of the total molar volume of the IMSL1 131. In yet another embodiment, either or none of the magnetic sub-layers IMSL1 131 or IMSL2 132 may have an oxide material.

In a particular embodiment of the PMR disk 200, the IMSL1 131 is made of an Alloy2 material, which is a cobalt-chromium-platinum alloy with titanium oxide and cobalt oxide additives having a composition of Co-14Cr-16Pt-(8 Mol % TiO2)-(8 Mol % CoO). The IMSL2 132 is made of an Alloy3 material, which is a cobalt-chromium-platinum-boron alloy with no oxide additives having a composition of Co-13Cr-22Pt-12B. In this embodiment, the IMSL1 131 has a higher $H_k$ than that of the IMSL2 132. Due to the oxide additive in the IMSL1 131, the IMSL1 131 also has better grain segregation as compared to the IMSL2 132.

In this particular embodiment, the IMSL2 132 is made of a magnetically softer material and functions as a switching assist layer for the IMSL1 131. In the presence of a write field, because the IMSL2 132 is magnetically softer and physically closer to the write head, the IMSL2 132 would switch magnetic orientation first. By switching its magnetic orientation first, the IMSL2 132 provides magnetic torque to assist the switching of IMSL1 131.

Figure 8:
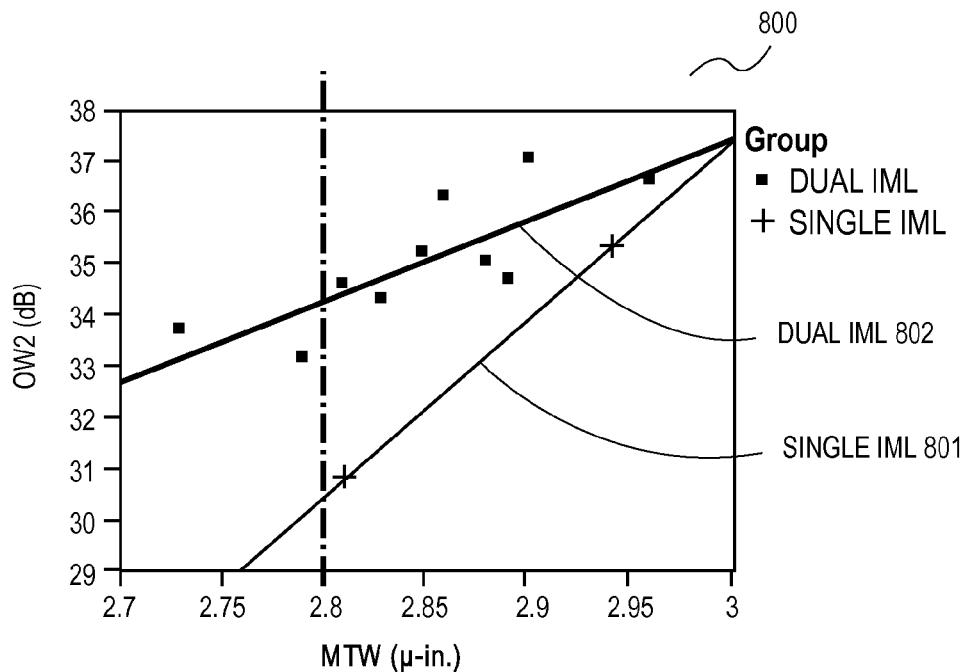
FIG. 8 illustrates the effects of a dual sub-layer structure in the intermediate magnetic layer on reverse overwrite performance with respect to written track width of a PMR disk according to one embodiment of the present invention.
Figure 9:
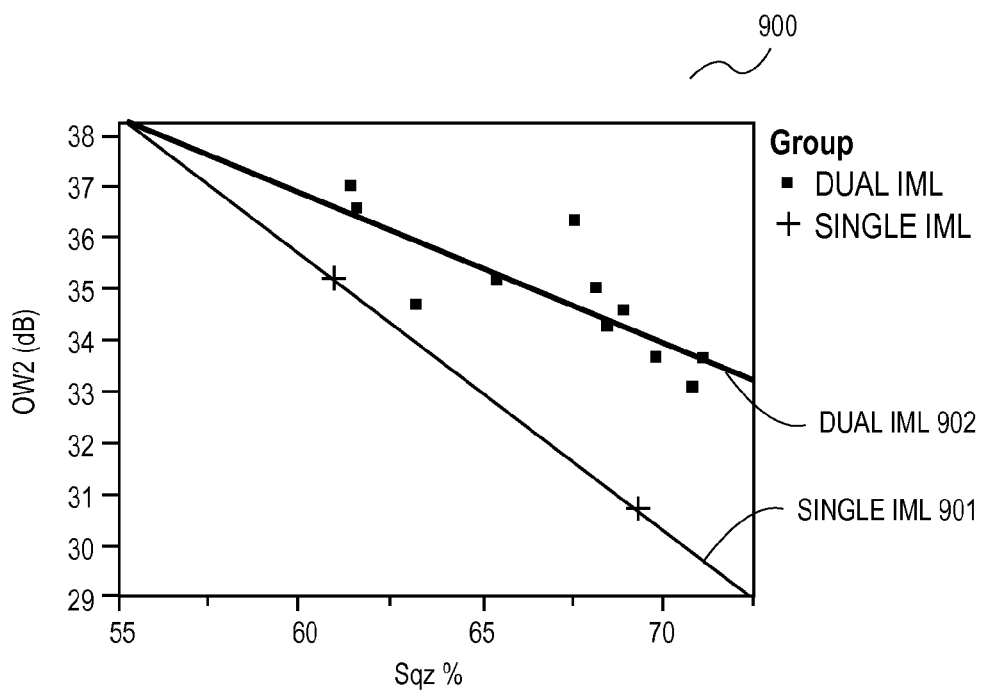
FIG. 9 illustrates the effects of a dual sub-layer structure in the intermediate magnetic layer on reverse overwrite performance with respect to squeeze performance of a PMR disk according to one embodiment of the present invention.

The write-ability improvement for this particular embodiment from the presence of a dual sub-layer structure in the IML 130 can be shown by comparing the reverse overwrite (OW2) performance verses magnetic track width 800 and the OW2 performance verses Sqz 900 of this embodiment against a recording medium with only a single intermediate magnetic layer as shown in FIGS. 8 and 9. The reverse OW2 is measured by writing a low frequency pattern over a previously recorded high frequency background pattern, and then measuring the reduction in the high frequency pattern's harmonic that results from the overwriting. In FIG. 8, the recording medium having a dual sub-layer IML 130 structure is denoted by the square sample points and extrapolated curve 802, and the recording medium having a single intermediate magnetic layer structure is denoted by the crosshair sample points and extrapolated curve 801. As FIG. 8 shows, for a magnetic track width of 2.8 μ-in., the reverse OW2 improves by more than 3 dB with the presence of the dual sub-layer structure in the IML 130. The dual sub-layer structure also shows increasingly improved reverse OW2 with increasing Sqz parameter as illustrated in FIG. 9 by comparing the performance of the dual sub-layer IML 130 structure denoted by extrapolated curve 902 against the performance of the single intermediate magnetic layer structure denoted by the extrapolated curve 901.

A cross-sectional view of another embodiment of a PMR disk 300 is shown in FIG. 3. In this embodiment, with the exception of the LML 120, the other layers in the PMR disk 300 are similar to that of the PMR disk 100 of FIG. 1. As such, a discussion of these other layers and their characteristics in relation to each other are not repeated here. In one embodiment of the structure of PMR disk 300, while the IML 130 has only a single layer structure, the LML 120 may include a first lower magnetic sub-layer (LMSL1) 121 and a second lower magnetic sub-layer (LMSL2) 122 disposed above the first lower magnetic sub-layer (LMSL1) 121. The dual sub-layer structure of the LML 120 may provide better SNR with better write-ability while maintaining thermal stability as compared to a single lower magnetic layer. Each of the magnetic sub-layers LMSL1 121 and LSML2 122 may have a different anisotropy field ($H_k$) and may have a thickness between 1 nm to 8 nm. The total thickness of the LML 120 may be between 6 nm to 9 nm. Any of the magnetic sub-layers LMSL1 121 and LMSL2 122 may have a large inter-granular exchange coupling.

In the PMR disk structure 300, the various magnetic layers 121, 122, 130, 140, and 150 may have different $H_k$'s such that the $H_k$ increases with the depth level of the layer. In other words, the top layer would have the lowest $H_k$, and the bottom layer would have the highest $H_k$. In one embodiment, the LMSL2 122 has a $H_k$ that is less than the $H_k$ of the LMSL1 121. In a particular embodiment, the $H_k$ of the LMSL1 121 is in a range of 13 kilo-Oersted (kOe) to 25 kOe. The $H_k$ of the IML 130 may be less than or equal to the $H_k$ of the LMSL2 122. The IML 130 may have a gradient $H_k$ increasing from the top of the layer to the bottom of the layer, with the bottom of the layer having the highest $H_k$ within the IML 130. The magnetic capping layer 150 may have a $H_k$ less than the IML 130.

In one embodiment, the material used in the LMSL1 121 may include an oxide material such as titanium oxide ($TiO_2$) or cobalt oxide (CoO). In an alternative embodiment, another oxide material such as chromium oxide ($Cr_2O_3$) or silicon dioxide ($SiO_2$) or a combination of other oxide materials may be used in the LMSL1 121. The oxide material in the LMSL1 121 may have a molar volume in the range of 5% to 30% of the total molar volume of the LMSL1 121.

The material used in the LMSL2 122 may also include an oxide material such as titanium oxide ($TiO_2$) or cobalt oxide (CoO). In an alternative embodiment, another oxide material such as chromium oxide ($Cr_2O_3$) or silicon dioxide ($SiO_2$) or a combination of other oxide materials may be used in the LMSL2 122, and the oxide material in the LMSL2 122 may be different than the oxide material in the LMSL1 121. The oxide material in the LMSL2 122 may have a molar volume in the range of 5% to 30% of the total molar volume of the LMSL2 122. In another embodiment, only one of the two magnetic sub-layers LMSL1 121 and LMSL2 122 may have an oxide material.

Figure 4:
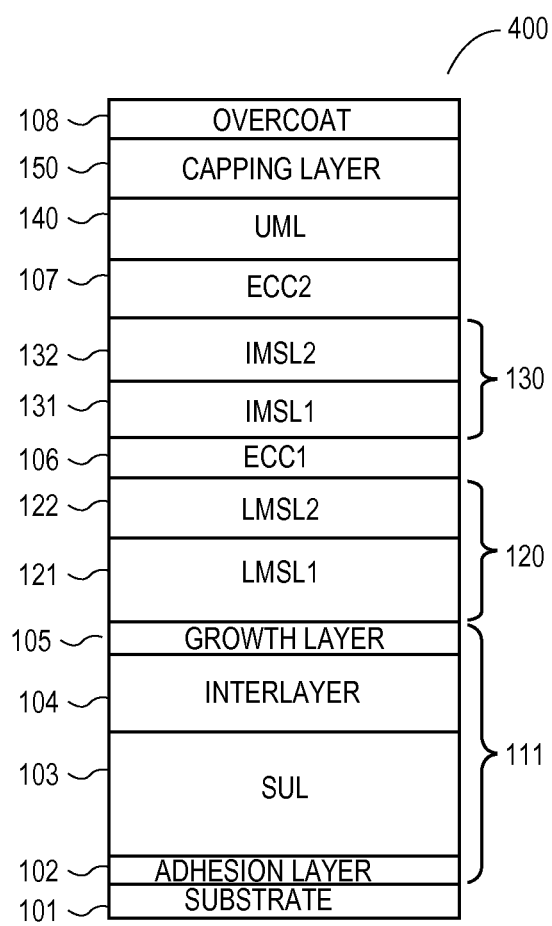
FIG. 4 illustrates a cross sectional view of a PMR disk according to an alternative embodiment of the present invention.

FIG. 4 shows a cross-sectional view of a further embodiment of a PMR disk 400. In this embodiment, the magnetic capping layer 150 and the UML 140 are similar to that of the PMR disk 100 of FIG. 1. The IML 130 may include a first intermediate magnetic sub-layer (IMSL1) 131 and a second intermediate magnetic sub-layer (IMSL2) 132 disposed above the first intermediate magnetic sub-layer (IMSL1) 131 similar to the IML 130 of the PMR disk 200 in FIG. 2. The IMSL2 132 may have a $H_k$ that is less than the $H_k$ of the IMSL1 131. The LML 120 may include a first lower magnetic sub-layer (LMSL1) 121 and a second lower magnetic sub-layer (LMSL2) 122 disposed above the first lower magnetic sub-layer (LMSL1) 121 similar to the LML 120 of the PMR disk 300 in FIG. 3. The LMSL2 122 may have a $H_k$ that is less than the $H_k$ of the LMSL1 121. The characteristics of each of the upper, intermediate, and lower magnetic layers have already been described above with references to FIGS. 1, 2, and 3 respectively. As such, a discussion of these layers and their characteristics in relation to each other are not repeated here. By combining the structures of the various embodiments described herein, PMR disk 400 may achieve the combined benefits of these other embodiments within one disk structure. The PMR disk 400 may have improved SNR-related performances and also better adjacent track interference (ATI) performance because ATI is dependent on high frequency SNR. The PMR disk 400 may also have improved write-ability with narrow track width with OW2 improvement of more than 2 dB over conventional dual magnetic recording layer disks without sacrificing thermal stability.

Referring back to FIGS. 1 through 4, embodiments of the PMR disk structure may have intervening layers 111 disposed between the substrate 101 and the LML 120. The intervening layers 111 may include an adhesion layer 102 disposed above the substrate 101, an underlayer (SUL) 103 disposed above the adhesion layer 102, one or more interlayer(s) 104 disposed above the SUL 103, and a growth layer 105 disposed between the interlayer 104 and the lower magnetic layer (LML) 120. The PMR disk may also have a overcoat layer 108 disposed above the magnetic capping layer 150 to protect the PMR disk. The overcoat layer 108 may be composed of carbon. The substrate 101 may be made of, for example, a metal, metal alloys such as nickel phosphorous (NiP), glass, or other substrate materials known in the art including polymers and ceramics. The exchange coupling layers ECC1 106 and ECC2 107 may be made of a cobalt-ruthenium (CoRu) alloy. In an alternative embodiment, additional layers may be present, and each of the layers may be made of other materials. Alternatively, other materials may be used for the various layers. A growth layer, interlayer, SUL, adhesion layer, and first substrate are well known in the art; accordingly, a detailed discussion is not provided herein.

The terms "above," "under," and "between" as used herein refer to a relative position of one media layer with respect to other layers. As such, for example, one layer disposed above or under another layer may be directly in contact with the other layer or may have one or more intervening layers. Moreover, one layer disposed between two layers may be directly in contact with the two layers or may have one or more intervening layers. In contrast, a first layer "on" a second layer is in direct contact with that second layer. Additionally, the relative position of one layer with respect to other layers is provided assuming operations are performed relative to a substrate without consideration of the absolute orientation of the substrate.

In the foregoing specification, the present invention has been described with reference to specific exemplary embodiments thereof. It will, however, be evident that various modifications and changes may be made thereto without departing from the broader scope of the embodiments of the invention as set for in the appended claims. The specification and drawings are, accordingly, to be regarded in an illustrative rather than a restrictive sense.

What is claimed is:

1. A perpendicular magnetic recording disk, comprising:
   a magnetic capping layer being substantially free of an oxide;
   an upper magnetic layer comprising a first oxide material, the upper magnetic layer disposed directly below and in contact with the magnetic capping layer, the upper magnetic layer having a first anisotropy field ($H_k$);
   an upper exchange coupling layer disposed below and in contact with the upper magnetic layer;
   an intermediate magnetic layer disposed below the upper exchange coupling layer, the intermediate magnetic layer having a second $H_k$;
   a lower exchange coupling layer disposed below the intermediate magnetic layer; and
   a lower magnetic layer disposed between the lower exchange coupling layer and a substrate, the lower magnetic layer having a third $H_k$, wherein the third $H_k$ is greater than the second $H_k$, and wherein the second $H_k$ is greater than the first $H_k$.

2. The perpendicular magnetic recording disk of claim 1, wherein the first oxide material has a molar volume in a range of 5% to 30% of the upper magnetic layer.

3. The perpendicular magnetic recording disk of claim 1, wherein the upper magnetic layer has a thickness in a range of 0.5 nanometers (nm) to 5 nm.

4. The perpendicular magnetic recording disk of claim 1, wherein the first oxide material in the upper magnetic layer comprises titanium dioxide ($TiO_2$) or cobalt oxide (CoO).

5. The perpendicular magnetic recording disk of claim 1, wherein the magnetic capping layer has a fourth $H_k$ being less than or equal to the first $H_k$.

6. The perpendicular magnetic recording disk of claim 5, wherein the first $H_k$ is in a range of 10 kilo-Oersted (kOe) to 20 kOe.

7. The perpendicular magnetic recording disk of claim 1, wherein the magnetic capping layer has a first inter-granular lateral exchange coupling and the upper magnetic layer has a second inter-granular lateral exchange coupling being less than the first inter-granular lateral exchange coupling.

8. The perpendicular magnetic recording disk of claim 1, wherein the intermediate magnetic layer comprises a first intermediate magnetic sub-layer having a fourth anisotropy field ($H_k$) and a second intermediate magnetic sub-layer above the first intermediate magnetic sub-layer having the second $H_k$, the second $H_k$ being less than the fourth $H_k$, and the second intermediate magnetic sub-layer being substantially free of an oxide.

9. The perpendicular magnetic recording disk of claim 8, wherein the fourth $H_k$ is in a range of 7 kilo-Oersted (kOe) to 20 kOe.

10. The perpendicular magnetic recording disk of claim 9, wherein the third $H_k$ is greater than or equal to the fourth $H_k$.

11. The perpendicular magnetic recording disk of claim 8, wherein the first intermediate magnetic sub-layer comprises a second oxide material.

12. The perpendicular magnetic recording disk of claim 11, wherein the second oxide material has a molar volume in a range of 5% to 30% of the first intermediate magnetic sub-layer.

13. The perpendicular magnetic recording disk of claim 11, wherein the second oxide material in the first intermediate magnetic sub-layer comprises titanium dioxide ($TiO_2$) or cobalt oxide (CoO).

14. The perpendicular magnetic recording disk of claim 11, wherein the first intermediate magnetic sub-layer has a first inter-granular lateral exchange coupling and the second intermediate magnetic sub-layer has a second inter-granular lateral exchange coupling being greater than the first inter-granular lateral exchange coupling.

15. The perpendicular magnetic recording disk of claim 1, wherein the lower magnetic layer comprises a first lower magnetic sub-layer having the third $H_k$ and a second lower magnetic sub-layer above the first lower magnetic sub-layer having a fourth $H_k$ being less than or equal to the third $H_k$.

16. The perpendicular magnetic recording disk of claim 15, wherein the third $H_k$ is in a range of 13 kilo-Oersted (kOe) to 25 kOe.

17. The perpendicular magnetic recording disk of claim 15, wherein the first lower magnetic sub-layer comprises a second oxide material.

18. The perpendicular magnetic recording disk of claim 17, wherein the second oxide material has a molar volume in a range of 5% to 30% of the first lower magnetic sub-layer.

19. The perpendicular magnetic recording disk of claim 17, wherein the second lower magnetic sub-layer comprises a third oxide material.

20. The perpendicular magnetic recording disk of claim 19, wherein the third oxide material has a molar volume in a range of 5% to 30% of the second lower magnetic sub-layer.

21. The perpendicular magnetic recording disk of claim 15, wherein the second lower magnetic sub-layer comprises a second oxide material.

22. The perpendicular magnetic recording disk of claim 21, wherein the second oxide material has a molar volume in a range of 5% to 30% of the second lower magnetic sub-layer.

23. A perpendicular magnetic recording disk, comprising:
a magnetic capping layer being substantially free of an oxide;
an upper magnetic layer comprising a first oxide material, the upper magnetic layer disposed directly below and in contact with the magnetic capping layer;
an upper exchange coupling layer disposed below the upper magnetic layer
an intermediate magnetic layer disposed below the upper exchange coupling layer;
a lower exchange coupling layer disposed below the intermediate magnetic layer; and
a lower magnetic layer disposed between the lower exchange coupling layer and a substrate, wherein the lower magnetic layer comprises a first lower magnetic sub-layer having a first anisotropy field ($H_k$) and a second lower magnetic sub-layer above the first lower magnetic sub-layer having a second $H_k$ being less than or equal to the first $H_k$, and wherein the intermediate magnetic layer has a third $H_k$ being less than or equal to the second $H_k$, and the magnetic capping layer has a fourth $H_k$ being less than the third $H_k$.

24. A perpendicular magnetic recording disk, comprising:
a magnetic capping layer being substantially free of an oxide;
an upper magnetic layer comprising an oxide material, the upper magnetic layer disposed directly below and in contact with the magnetic capping layer;
an upper exchange coupling layer disposed below the upper magnetic layer;
an intermediate magnetic layer disposed below the upper exchange coupling layer, the intermediate magnetic layer comprising a first intermediate magnetic sub-layer having a first anisotropy field ($H_k$) and a second intermediate magnetic sub-layer disposed above the first intermediate magnetic sub-layer having a second $H_k$ being less than or equal to the first $H_k$;
a lower exchange coupling layer disposed below the intermediate magnetic layer;
a lower magnetic layer disposed between the lower exchange coupling layer and a substrate, the lower magnetic layer comprising a first lower magnetic sub-layer having a third $H_k$ and a second lower magnetic sub-layer above the first lower magnetic sub-layer having a fourth $H_k$ being less than or equal to the third $H_k$, wherein the first $H_k$ is less than the fourth $H_k$; and
a soft magnetic underlayer (SUL) of the perpendicular magnetic recording disk disposed between the substrate and the lower magnetic layer.

25. The perpendicular magnetic recording disk of claim 24, wherein the oxide material has a molar volume in a range of 5% to 30% of the upper magnetic layer.

26. The perpendicular magnetic recording disk of claim 24, wherein the oxide material in the upper magnetic layer comprises titanium dioxide ($TiO_2$) or cobalt oxide (CoO).

* * * * *